Sept. 27, 1949.  B. H. SNOOK  2,483,069
HEATING JACKET FOR COOKING UTENSILS
Filed Nov. 27, 1945  2 Sheets-Sheet 1
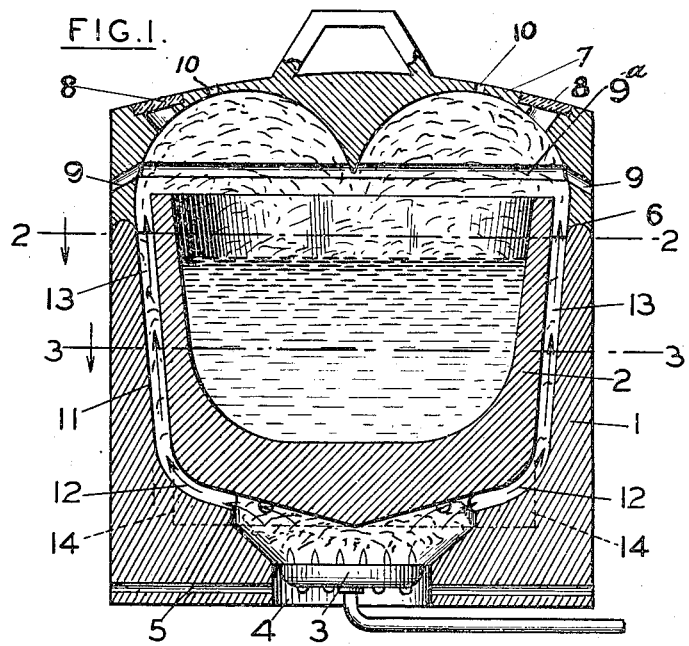
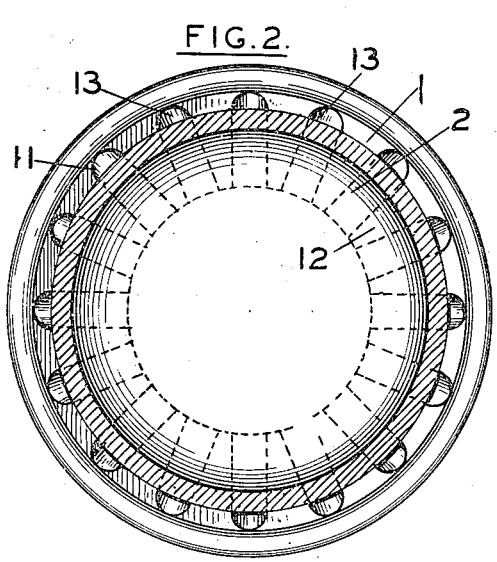
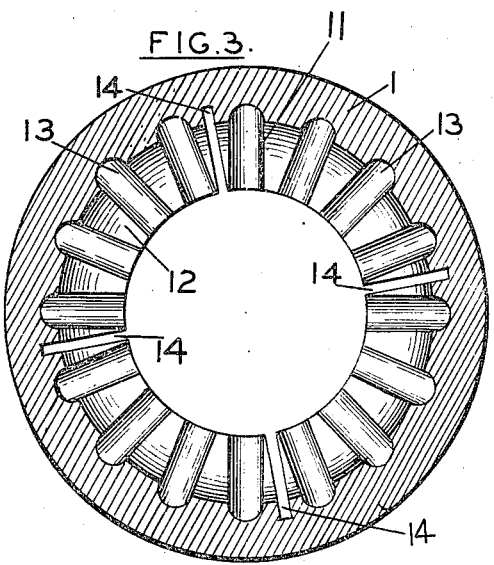
INVENTOR
BENJAMIN H. SNOOK
BY
ATTORNEYS

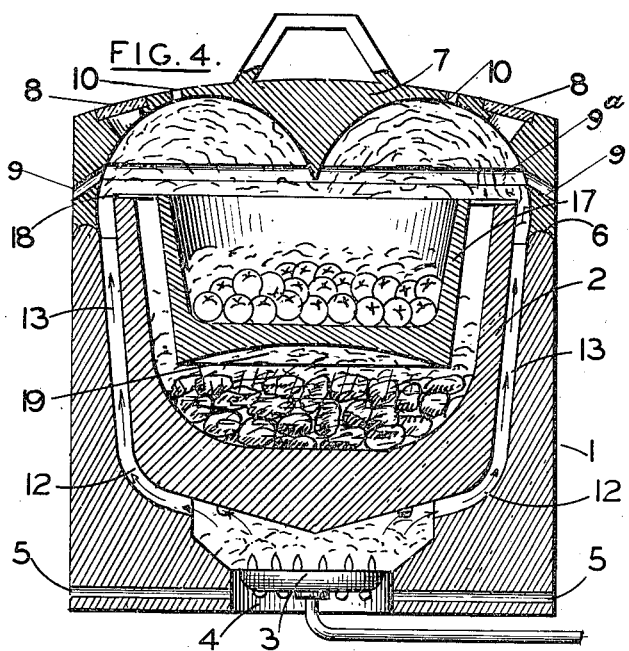
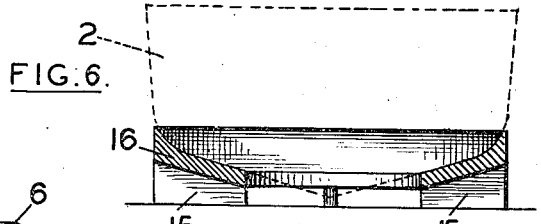
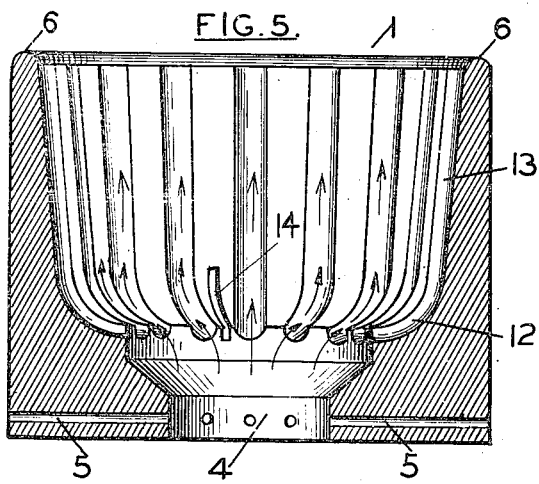
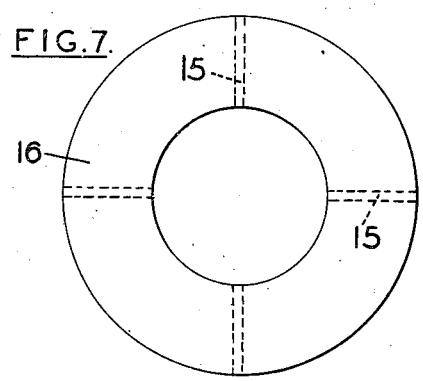

Patented Sept. 27, 1949

2,483,069

UNITED STATES PATENT OFFICE 2,483,069

HEATING JACKET FOR COOKING UTENSILS

Benjamin H. Snook, Denver, Colo.

Application November 27, 1945, Serial No. 631,024

2 Claims. (Cl. 126—376)

The present invention relates to cooking utensils and is more particularly concerned with a container and enclosing casing or jacket to confine and utilize the heat during the cooking process.

One of the objects of the invention is to provide a novel form of jacket to hold removable food containers for cooking purposes and to confine and evenly distribute heat to all parts of the container.

Another object of the invention is to provide a jacket or casing for removable food containers constructed to reduce the amount of heat necessary for cooking purposes with a consequent saving of fuel.

A further object of the invention is to provide a jacket and food container constructed to more efficiently utilize fuel and heat in the cooking process.

Still another object of the invention is to provide a cooking utensil, of the character referred to, of simpler and more compact construction than is disclosed in prior devices.

With the foregoing and other objects and advantages in view, the invention consists of the novel construction and arrangement of parts hereinafter described and claimed.

In the accompanying drawings illustrating the invention:

Figure 1 is a vertical transverse section of the invention.

Figure 2 is a horizontal section on line 2—2 of Figure 1.

Figure 3 is a horizontal section of the jacket or casing on line 3—3 of Figure 1.

Figure 4 is a vertical transverse section showing two food containers within the jacket.

Figure 5 is a vertical transverse section of the jacket to show the vertical flues or heat ducts.

Figure 6 is a vertical transverse section of the container base or support.

Figure 7 is a top plan view thereof.

Like numerals in the description and drawings designate the same parts of construction.

The exterior or outside element 1 of this cooking utensil is hereinafter referred to as the jacket, and the inner element 2 as the container. Jacket 1 is constructed, preferably, of stainless steel or aluminum and its exterior wall may be circular. It is designed to support the container 2 above an electric, gas, or oil burner 3. The bottom is provided centrally with an opening 4, which fits over the burner, and cold-air ducts 5, which radiate from this central opening 4. The central opening is flared or enlarged at the top where it enters the bowl-like bottom 12 of the circular interior of the jacket 1. The jacket 1 is provided on its rim with an annular bead 6 on which a jacket cover 7 rests.

The cover 7 is provided with suitable arcuate glass inspection windows 8 in its top, and with vents 9 and 10 in sides and top, respectively. The top vents 10 are for the escape of excess heat which could cause undesirable pressure underneath the cover 7, and the side vents 9 for escape of moisture. An annular groove 9a is formed about the inner wall of the cover 7 for collecting moisture condensing in the cover and directing the moisture to the vent openings 9. The under side of the cover 7 is preferably arcuate in form, as indicated providing an annular concave heat-deflecting wall or member, to deflect heat downward on the container 2.

The inner side wall 11 of the jacket 1 is circular in form, with its diameter gradually reduced from the rim 6 to the bottom 12. At suitable intervals, the inside wall 11 is formed with vertically disposed semi-circular grooves or channels 13 which extend from the flared part of central opening 4 to the rim 6 of the jacket, the grooves or channels forming with the wall and bottom of the container 2 a plurality of flues for conveying the heat emitted from the burner 3 to the jacket cover 7.

Between the channels 13, the wall 11 of the jacket 1 is provided with a plurality of vertical slots or channels 14 for the reception of the legs 15 of the stand 16, on which the container 2 rests. The stand 16 is preferably used for supporting short containers within the jacket so the upper surface of material in the smaller container will be supported close to the inner wall of the cover 7. The number of such legs 15 is preferably four, radially disposed and provided with horizontal and perpendicular edges. They are flat and of sufficient thickness to provide rigidity, and are integral with the stand 16. The interior of the stand 16, which is annular and shaped to fit the bottom 12 of the jacket 1 with a central opening to register with jacket opening 4, is formed to fit the rounded bottom of the container 2. The container 2 also rests on the stand 16 when removed from the jacket 1. Container 2 projects, preferably, a suitable distance above the rim 6 of the jacket 1.

Other and graduated containers may be placed within the first container 2, as illustrated in Figure 4 where a smaller container 17 is suspended on the rim of container 2 by laterally-projecting, horizontal ears 18, and similarly constructed supplemental containers may be employed.

The container 17, as well as other supplemental containers, should be shaped and dimensioned to permit the free circulation of heat above and below. The bottoms 9 of such containers are preferably concave, as shown in Figure 4. This form of bottom 9 deflects the heat to the food in the container next beneath.

In the operation of the device, the heat rises from the burner 3 and contacts the underside of the container 2. Thence it spreads outward and upward all around the container 2. It is conducted through the ducts or channels 13 in the jacket 1 to the under side of cover 7, where pressure of the upwardly flowing heat causes it to follow the curvature of the underside of the cover 7 and deflect downward onto the contents of the container 2. In the case of supplemental containers 17, since they are suitably spaced apart by the reduction in diameter, the downwardly deflected heat will flow in between the several containers 17 and reach their contents through the pressure above referred to. Thus the food in all containers 2 and 17 is effectively surrounded by heat. As the vents 9 are formed of restricted, downwardly and outwardly-inclined passages and the vents 10 are very restricted in cross-section, the loss of heat therefrom is greatly minimized and therefore the heat is substantially contained within the container with a negligible heat loss through the vents.

When the pressure has increased sufficiently to escape in any quantity, as above explained, heat and pressure from below will continue. At this time the heat can be reduced, as desired, thus saving fuel. Heat loss is greatly reduced by this invention, with a consequent saving of gas, electricity or oil, whichever may be the heating agency.

This cooking utensil may be used in restaurants as well as homes, and is adapted to cooking several different kinds of food simultaneously. It can also be used for boiling, baking, roasting, and frying. It can also be used for oven canning and canning on top of the range. It can also be used for serving food. Many other uses could be mentioned. It will be noted that the construction explained permits cooking to continue after heat is cut off.

Having thus described my invention what I claim as new and desire to secure by Letters Patent, is:

1. A cooking utensil comprising a jacket having an upwardly opening chamber and a bottom wall formed with a central opening within which a heating element is adapted to be engaged, a container disposed in said jacket, the inner walls of said jacket being engageable with said container in said chamber and formed with vertically, inwardly opening, grooves, said bottom wall supportingly engaging the bottom of said container and formed with radial, upwardly opening, grooves, communicating with said central opening and said vertical grooves, said vertical and radial grooves forming with the wall and bottom of said container respectively a plurality of flues for conveying the heat emitted from the heating element to the top of said jacket and a cover engageable with the upper edge of said jacket and being formed with an annular concave heat deflecting member communicating with said flues and said container for deflecting heat from said heating element into said container.

2. A cooking utensil comprising a jacket having an upwardly opening chamber and a bottom wall formed with a central opening within which a heating element is adapted to be engaged, a container disposed in said jacket, the inner walls of said jacket being engageable with said container in said chamber and formed with vertically, upwardly opening, grooves, said bottom wall supportingly engaging the bottom of said container and formed with radial, upwardly opening, grooves, communicating with said central opening and said vertical grooves, said vertical and radial grooves forming with the wall and bottom of said container respectively a plurality of flues for conveying the heat emitted from the heating element to the top of said jacket a cover engageable with the upper edge of said jacket being formed with an annular concave heat deflecting member communicating with said flues and said container for deflecting heat from said heating element into said container, said cover having an inwardly opening groove on the inner wall thereof communicating with a moisture drain opening through the wall of said cover adjacent the lower edge thereof.

BENJAMIN H. SNOOK.

REFERENCES CITED

The following references are of record in the file of this patent:

UNITED STATES PATENTS

| Number | Name | Date |
| --- | --- | --- |
| 832,274 | Probst | Oct. 2, 1906 |
| 935,189 | Coles | Sept. 28, 1909 |
| 1,091,649 | Grady | Mar. 31, 1914 |
| 1,144,199 | Hermann | June 22, 1915 |
| 2,172,469 | Grigas | Sept. 12, 1939 |

FOREIGN PATENTS

| Number | Country | Date |
| --- | --- | --- |
| 185,600 | Great Britain | Sept. 14, 1922 |
| 204,526 | Great Britain | Oct. 4, 1923 |
| 286,297 | Great Britain | Oct. 25, 1928 |
| 531,905 | Germany | Aug. 17, 1931 |